United States Patent
Bromley et al.

(10) Patent No.: US 9,704,289 B2
(45) Date of Patent: Jul. 11, 2017

(54) INDEXING METHOD AND SYSTEM

(71) Applicant: Whitecap Scientific Corporation, St. John's (CA)

(72) Inventors: Samuel Patrick Bromley, St. John's (CA); Richard Jacques Charron, St. John's (CA)

(73) Assignee: Whitecap Scientific Corporation, St. John's, NL (CA)

( * ) Notice: Subject to any disclaimer, the term of this patent is extended or adjusted under 35 U.S.C. 154(b) by 346 days.

(21) Appl. No.: 14/271,013

(22) Filed: May 6, 2014

(65) Prior Publication Data

US 2015/0325043 A1 Nov. 12, 2015

(51) Int. Cl.
*G06T 15/00* (2011.01)
*G06T 17/00* (2006.01)
*G06F 17/30* (2006.01)

(52) U.S. Cl.
CPC ........ *G06T 17/00* (2013.01); *G06F 17/30244* (2013.01); *G06T 15/005* (2013.01)

(58) Field of Classification Search
CPC .. G06T 15/005; G06T 17/00; G06F 17/30244
USPC ........................................ 345/419, 424, 426
See application file for complete search history.

(56) References Cited

U.S. PATENT DOCUMENTS

| 4,985,856 | A | 1/1991 | Kaufman et al. |
| 6,765,572 | B2 | 7/2004 | Roelofs |
| 8,587,583 | B2 | 11/2013 | Newcombe et al. |
| 8,773,946 | B2 * | 7/2014 | Padmanabhan ........ G01C 15/00 367/7 |
| 8,963,916 | B2 * | 2/2015 | Reitan ..................... G06F 3/011 345/419 |

FOREIGN PATENT DOCUMENTS

WO 2014/087313 A1 6/2014

OTHER PUBLICATIONS

Moons et al, 3D Reconstruction from Multiple Images Part 1: PrinciplesComputer Graphics and Vision, vol. 4, No. 4 (2008), pp. 287-398.*
"International Search Report for corresponding International Patent Application No. PCT/CA2015/000309 mailed Jan. 11, 2016".

* cited by examiner

*Primary Examiner* — Phu K Nguyen
(74) *Attorney, Agent, or Firm* — Merchant & Gould P.C.

(57) ABSTRACT

A method is disclosed for capturing 3D model data including data relating to each of a plurality of voxels and relating to an object. A plurality of images of the object are captured. The plurality of images are correlated with the 3D model data to produce index data, the index data for indicating a correlation between some of the plurality of images and some of the plurality of voxels. The index data is then stored.

24 Claims, 5 Drawing Sheets

INDEXING METHOD AND SYSTEM

FIELD OF INVENTION

The present invention relates to correlating 3-dimensional (3D) models and 2-dimensional (2D) images, in particular the indexing of a 2D image and a 3D model for correlating therebetween.

BACKGROUND

Advancements in image-processing techniques including new processes and the use of more powerful graphics processors has lead to increased reliance on visual data. For example, streams of 2D images, typically referred to as videos, are analysed and a 3D model is generated therefrom. The generation of 3D models is used in the entertainment, gaming, natural sciences, medicine, inspection, reverse engineering, and mining industries. Some 3D models are generated to produce a 'virtual' world—an artificial 3D image in an artificial world as is used in animation or gaming; these 3D models need not be accurate and, in fact, are often modified afterwards to improve the overall effect. In other applications, 3D models are generated from 2D photographs or videos captured of a real world object. Also 3D models are formable by scanning a real world object with a 3D scanner. These 3D models provide valuable information of real world objects in a compact format easily understood by human beings.

Range information provides a distance measure between a measurement apparatus and a target. Typically, a range between a range sensor and a point in 3D space is determined. For generating a 3D model of a real world object, multiple ranges are determined to form a 3D map of the closest surface(s) to the range sensor. For example, a distance sensor faces a wall, the point on the wall directly in front of the distance sensor is the closest point to the distance sensor and is also considered to be the center point. Points on the wall further from the center point are also further away from the distance sensor. Ranges measured between points on the surface of a real world object in 3D space aid in determining the shape of the surface in the corresponding 3D model. For example, if the wall is flat, the distance between any two adjacent points on the wall is an expected value. However, if the wall is not flat, the distance between two adjacent points on the wall is other than the expected value, indicating that the wall is not flat, but instead is curved, or is at least curved at that portion of the surface of the real world object. There are many range sensors including, but not limited to, Lidar, infrared (IR), Sonar, stereoscopic, LASER, ultrasound, patterned light, RF, etc. that are used in many different applications. That said, essentially, each range sensor attempts to determine a distance between the range sensor and a target.

When a 3D model is generated using 3D imaging, the range information sensed or calculated is viewed as source data and is either archived or discarded, depending on the application. Thus, when a range sensor is used to scan a space for forming a 3D map thereof, the range values are not part of the 3D model, though the 3D model is based on them. Once the 3D model is generated, the range data has been utilised for its intended purpose. Similarly, with stereoscopic range finders, once the 3D model is generated, the image data has served its purpose. Of course, in stereoscopic 3D modeling, it is known to superimpose a skin on the 3D model to provide it with color, texture, etc. allowing for rendering of image data from the 3D model.

In auto-industry quality assurance applications, 3D models are constructed from 2D videos of newly assembled parts of a car. Some car parts are complex to assemble and have tight tolerances. Once 3D models are constructed from the 2D images, the 3D model of the car part is compared to an original computer aided drawing (CAD) model to determine if the assembled car part meets engineering standards. In this application, the source data is often discarded.

For industries requiring inspection of a real world object in an installed state, including both animate and inanimate objects, it is known to capture video footage of the installed object at intervals, usually by an operator, and to review the object for irregularities, potential problems, and wear by experts in the field. The operators are often trained to work in extreme environments, such as in mines, underwater, or on high towers. Alternatively, operators are trained to use complex inspection equipment such as unmanned remote operated vehicles (ROVs) or robots. In some applications, the operator annotates the video footage when the operator notices a condition or situation of note while recording the video, for example, by recording a time indicator for the video and a brief description of the issue found. The video when reviewed by industry experts, is either more closely analysed or analysed only before, during and after the time noted by the operator to determine if there indeed is an issue. If an issue is determined, the expert decides what action is required or if the noted problem should be monitored over time. Without annotation by the operator, the experts are forced to view carefully hours of video footage to detect an issue with the object onscreen. Alternatively, the experts monitor live videos feeds as video data is captured.

It is difficult to automatically associate captured video data with items of interest, areas of concern, etc. without manually indicating such for the expert reviewer or without navigating to those areas of interest by the expert themselves.

It would be advantageous to overcome some of the disadvantages of the prior art.

SUMMARY OF THE EMBODIMENTS OF THE INVENTION

In accordance with the invention there is provided a method comprising capturing 3D model data relating to each of a plurality of voxels, the 3D model data relating to an object and for forming a 3D model of the object; capturing a plurality of images of the object wherein each of the plurality of images comprises at least one pixel; correlating the plurality of images with the 3D model data to produce an index, the index for indicating a correlation between some of the plurality of images of the object and some of the plurality of voxels; and storing the index for retrieval.

In accordance with the invention there is provided another method comprising viewing an image of an object; selecting at least a pixel within the image of the object; correlating the at least a pixel within the image of the object with a voxel within a 3D model of the object; and retrieving a plurality of images of the object each of the plurality of images indexed in association with the voxel, each image of the plurality of the images including a view of a same surface of the object as the selected at least a pixel.

In accordance with the invention there is provided another method comprising capturing 3D model data relating to each of a plurality of voxels, the 3D model data relating to an object; capturing sensor data associated with the object; correlating the sensor data with the 3D model data to produce an index, the index for indicating a correlation between some of the sensor data associated with the object and some of the plurality of voxels; and storing the index for retrieval.

BRIEF DESCRIPTION OF THE DRAWINGS

Exemplary embodiments will now be described in conjunction with the following drawings, wherein like numerals refer to elements having similar function, in which.

DETAILED DESCRIPTION OF THE EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein. Moreover, in the following description the expression "correlation" indicates the link between the 3D spatial data and the corresponding image data. One skilled in the art will appreciate that it is not a mathematical correlation; rather, as is apparent throughout the specification and claims, the present invention builds an index in which the index associates the 3D spatial data with the actual image data captured of a given object. As is further apparent, the index then becomes a powerful tool to search in both image data and 3D spatial data, allowing a user to access either the spatial data or the image data, while preserving the link between the original spatial data and the image data.

Figure 1:
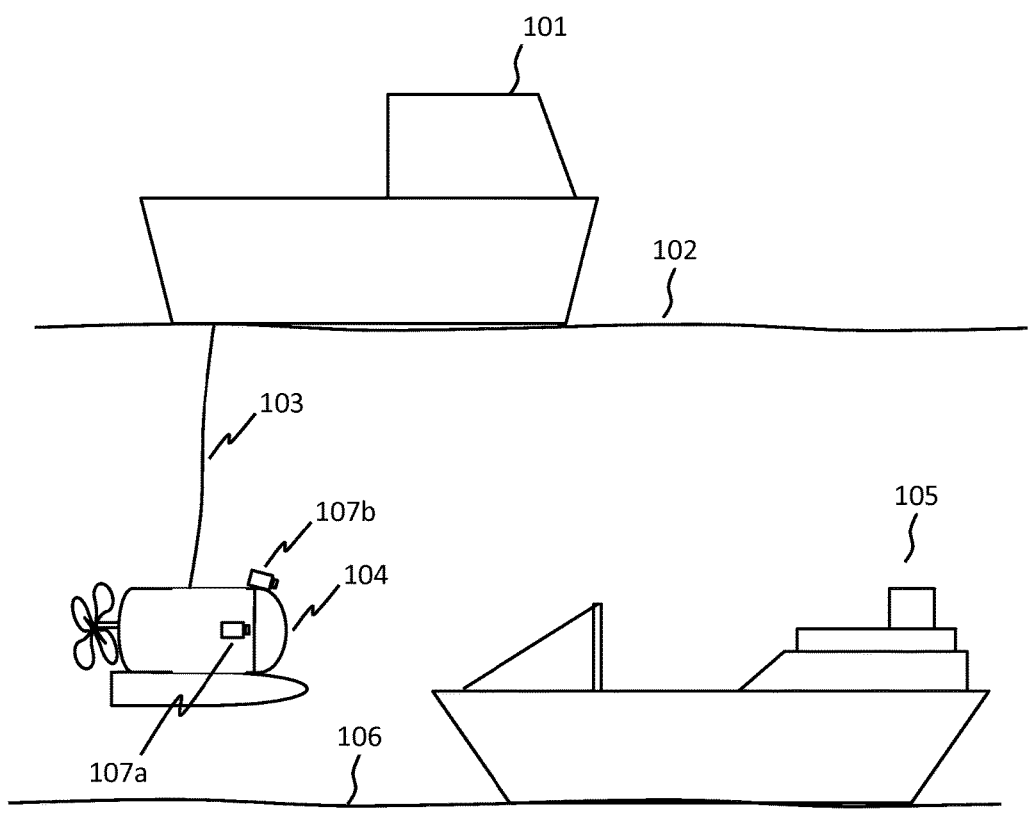
FIG. 1 is a simple diagram of an exemplary data acquisition system for the inspection of a real world object.

FIG. 1 is a simplified diagram of an exemplary data acquisition system for the inspection of a real world object. Tanker 105 carrying environmentally hazardous material, for example diesel, ran aground and sank to ocean floor 106. An underwater survey company (USC) investigates the condition of tanker 105 by surveying the damage and determining if tanker 105 is leaking diesel. The USC ship 101 travels to a location above tanker 105 and drops remotely operated vehicle 104 (ROV) into ocean 102. ROV 104 is tethered to ship 101 via tether cable 103. Electrical and/or fibre optic cables (unseen) within tether cable 103 enable remote control of ROV 104 by an operator aboard ship 101 as well as the streaming of data collected by the ROV 104 sensing equipment back to the ship 101. For example, ROV 104 circles the tanker 105 and captures video data of the hull via video cameras 107a, 107b and 107c (107c is located on the side of ROV 104 not shown). Three video streams are transmitted to ship 101 via tether cable 103 for live viewing. Optionally, ROV 104 circles tanker 105 multiple times—making multiple passes during the same inspection—capturing more video data of the hull. However, video cameras 107a, 107b and 107c record the hull from a different angle during each pass. Alternatively, the video data is stored within a data store for future use. While ROV 104 captures video images of the hull of tanker 105 from each video camera 107a, 107b and 107c, the operator notes any defects that are seen on the video and the time on the video the defect is recorded. Industry experts, such as naval engineers and wet welders, view the videos either on ship 101 or view the recorded video data once ship 101 returns to port, paying significant attention to clips in the videos that were noted by the operator. Optionally, the operator annotates the video by adding audio commentary to the video, adding a visual cue to the video or adding another indicator to the video to indicate locations on the hull requiring further inspection and the time on the video these locations are recorded. Based on the condition of tanker 105 observed in the video footage, it is determined if the hull requires repair or if certain portions of the hull of tanker 105 require future inspection. Similar inspections of tanker 105, as described above, are conducted periodically to monitor the hull of tanker 105 for deterioration.

Alternatively, control of ROV 104 is wireless, for example, via an acoustic communication system or an acoustic-optical communication system. Alternatively, data collected from ROV 104 sensors is stored on a local data store on ROV 104 and transmitted to a second data store onboard ship 101 or to a data store on land. Alternatively, data collected by ROV 104 sensors are transmitted wirelessly to ship 101. Various communication systems for remote control of ROV 104 and the transmission of sensor data from ROV 104 to ship 101 are implementable.

The following is a description of one simplified method for constructing 3D models from 2D images. Referring again to FIG. 1, video cameras 107a, 107b and 107c are positioned such that the field of view of one camera overlaps with the field of view of at least a second camera. A specific and non-limiting example is a first portion of the hull of tanker 105 is simultaneously present in the field of view cameras of 107a and 107b and a second portion of the hull of tanker 105 is simultaneously present in the field of view of cameras 107b and 107c. However, construction of 3D models from 2D images is well studied and typically relies on at least 2 images to provide range information when their fields of view overlap. Optionally, ROV 104 comprises a plurality of video cameras greater than three to record video of tanker 105. ROV 104 rotates about tanker 105 360 degrees, capturing video footage of the surface of the entire tanker 105. Video cameras 107a, 107b and 107c are attached to ROV 104 at known locations with known orientations. Thus the images recorded by each video camera 107a, 107b and 107c of tanker 105 are taken from different known vantage points. Optionally, ROV 104 circles tanker 105 multiple times—making multiple passes during the same inspection—capturing more video data of the hull. ROV 104 does not travel the exact same path during each pass thus video cameras 107a, 107b and 107c record the hull from different vantage points. Images are captured of the same portions of the hull of tanker 105 as previously recorded, but at different angles. Over lapping images of the same portions of the hull captured by at least two of video cameras 107a, 107b and during each pass is further used to provide range information for construction of the 3D model. Video data indicative of the video footage from each video camera 107a, 107b and 107c is stored in a data store, for example, in a data store on ship 101. Next, image processing is performed on images from each of video cameras 107a, 107b and 107c to construct a 3D model of tanker 105. For example, range data is determined for overlapping portions of the video images captured simultaneously. The range data is used to place physical objects within a 3D grid. Once the video data is completely processed, each portion of the hull of tanker 105 has been ranged and a detailed 3D model of the exterior of the hull of tanker 105 results. Range data is typically calculated by triangulation, though a range sensor is also useful for determining a range to a surface of the hull of the tanker 105. Alternatively, another technique for constructing 3D models from 2D images is implemented. Once a 3D model is formed, 3D model data corresponding thereto is stored.

When a 3D model is formed, either during data capture or afterward, any annotations associated with a pixel are also associatable with a voxel. Alternatively, when the 3D model is generated during data capture, annotations are associated directly with voxels within the generated model by the operator during operation of a data capture device. For example, the 3D model is shown to the operator during image capture. This model allows the operator to evaluate a completeness of the data capture operations. The 3D model is highlightable to highlight or select voxels or groups of voxels therein. The operator selects one or more voxels and provides an annotation associated therewith. By associating annotations with a voxel, it is often more easy to associate the annotations accurately with a specific 3 dimensional feature. Further, associating the annotation with images and image portions is a simpler process—voxel to image—instead of another process—image to voxel to images.

Figure 2A:
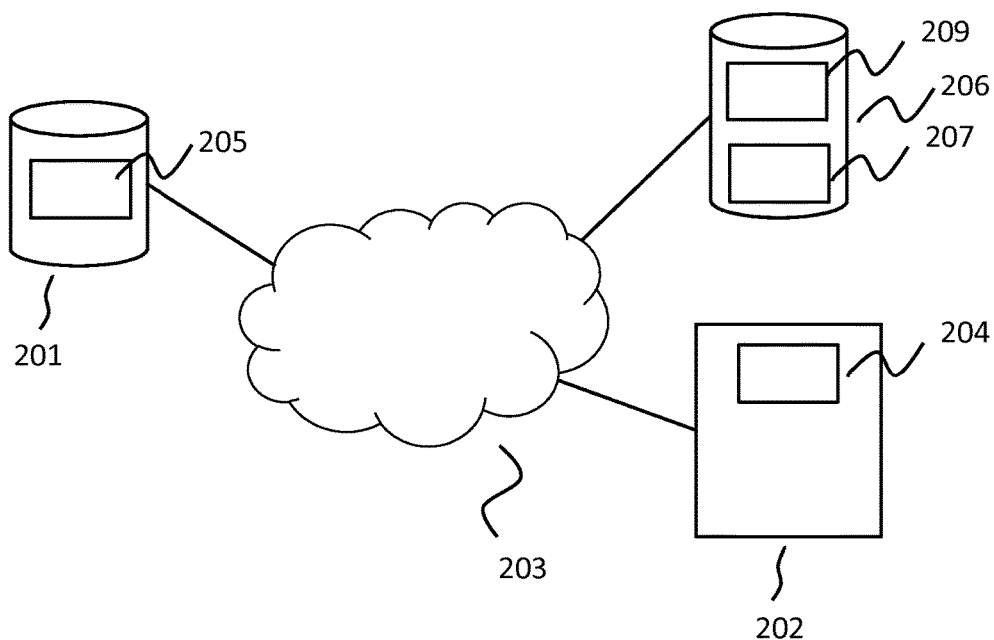
FIG. 2a is a simple diagram of a 2D image to 3D model indexing system

FIG. 2a is a simple diagram of a 2D image to 3D model indexing system. Video data 205 indicative of video recorded by video cameras 107a, 107b and 107c is stored on server 201, as shown in FIG. 2a. Each video frame recorded by a video camera comprises a plurality of pixels and forms a still image. In this embodiment, video cameras 107a, 107b and 107c are 1080 p 60 Hz high definition video cameras. For example, the frame size of each video frame captured by video camera 107a is 1920 pixels wide×1080 pixels high—2,073,600 pixels in total and records 60 video frames per second. Video data 205 stored on server 201 comprises pixel data for each pixel within each video frame captured by video cameras 107a, 107b and 107c. Alternatively, the video data is a transformation of the pixel data, for example compressed pixel data. Alternatively, video cameras 107a, 107b and 107c have another resolution and sampling rate.

Computer 202 comprising processor 204 is in communication with server 201 via a communication network, for example, LAN 203. Alternatively, the communication network is a WAN, such as the Internet. A 3D model of tanker 105 is generated from processed video frames selected from video recorded by at least two of the three video cameras 107a, 107b and 107c. Processor 204 fetches and then processes video data 205 to construct a 3D model of tanker 105 and stores 3D model data 207 indicative of the 3D model in data store 206, also in communication with communication network 203. Further image data 209, for example, video frame data used to generated the 3D model of tanker 105, is stored in data store 206. The 3D model of tanker 105 comprises a plurality of voxels wherein each voxel represents a value on a regular grid in 3D space and voxels having content form a 3D image of tanker 105. Each voxel in 3D space is uniquely positioned, as no two voxels can be located at the same point. 3D model data 207 comprises voxel data indicative of data stored within voxels and forming the 3D model. For example, when the range to a portion of the hull of tanker 105 is determined, that portion is located within the 3D grid and each voxel intersecting with the hull location is filled with an indication that an object surface is within said voxel. Alternatively, colour and texture information for the surface is stored within the voxel. Voxel data comprises at least a datum and is dependent on a variety of factors, such as the data type used to construct the 3D model. In this example, one data type used to construct the 3D model is image data. Alternatively, the data type is other than image data. For example, a heat sensor detects the temperature of the surface of a real world object and the temperature data is used to construct a 3D thermal model of the real world object. Further alternatively, the data type is both image data and other than image data.

Figures 2B, 2C:
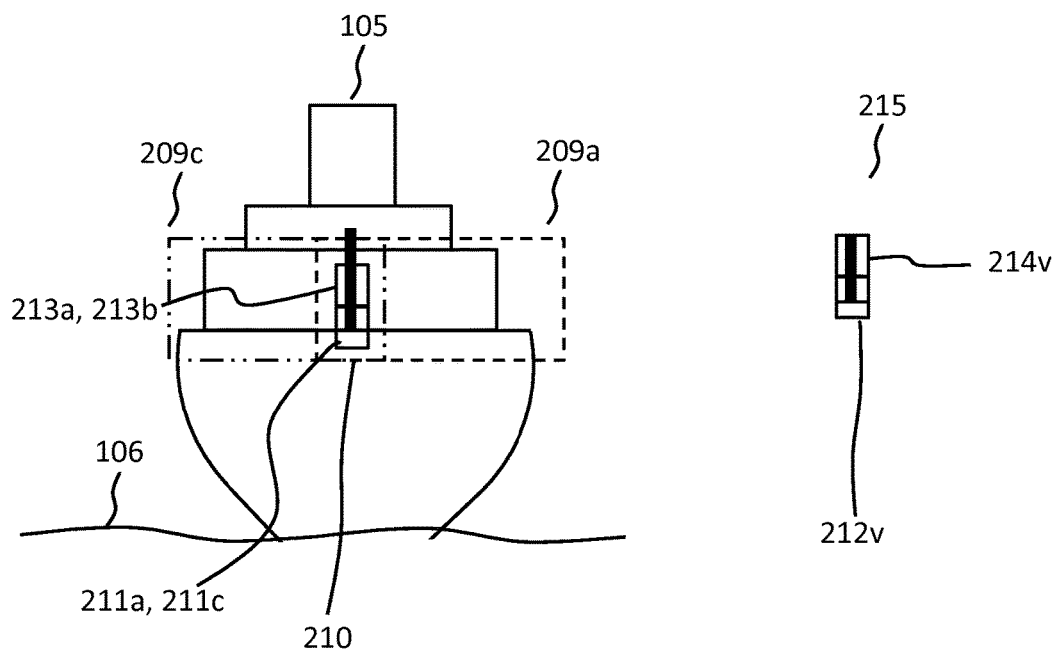
FIG. 2b is a front view of a tanker with captured video frames of the tanker overlaid on top.
FIG. 2c is a simple block diagram of a 3D image of a 3D model comprising 2 voxels.

Referring now to FIG. 2b, shown is a front view of tanker 105 with video frames 209a and 209c from video data 205 of tanker 105 captured by video cameras 109a and 109c, respectively, overlaid on top. During 3D modelling, processor 204 identifies video frames 209a and 209c, both of which comprise first portion 210 of tanker 105. In particular, pixels 211a and 211c are identified to be a same first point on tanker 105 in video frames 209a and 209c, respectively. Triangulation with the known base/baseline—a distance between the video cameras—and two angles—from each camera to the identified pixels—allows for determination of range. The voxel within the 3D grid at the location of the surface imaged by the pixels 211a and 211c has data stored therein to generate the 3D model of tanker 105. Shown in FIG. 2c is voxel 212v in 3D image 215 of the 3D model of tanker 105. Voxel 212v illustrates the first point of tanker 105 in the 3D model. Next, pixels 213a and 213c are identified to be a second point on tanker 105 in video frames 209a and 209c, respectively. Pixel data indicative of pixels 213a and 213c is processed to generate voxel data of voxel 214v also shown in FIG. 2c. Voxel 214v illustrates the second portion of tanker 105 in 3D image 215. For illustration purposes only, pixels 211a, 211c, 213a and 213b in FIG. 2b are not shown to scale. Furthermore, the above describes a simplified 2D image to 3D model construction process and in practise, generating a 3D model from 2D images is more complex and often comprises iterative steps and pre and post processing.

During 3D model construction, each pixel or group of pixels relied upon to extract voxel data is associated with said voxel. For example, a look up table (LUT) is formed for associating therebetween. Alternatively, another form of correlation data is stored. Correlation data indicating the correlation of 2D images or portions thereof used in the construction of a 3D model, and more particularly used for extracting specific voxel data, is stored in a data store. Optionally, the correlation data comprises an indication of the correlation between pixels selected from a set of 2D images and the voxel to which they correspond within the 3D model.

Figure 3A:
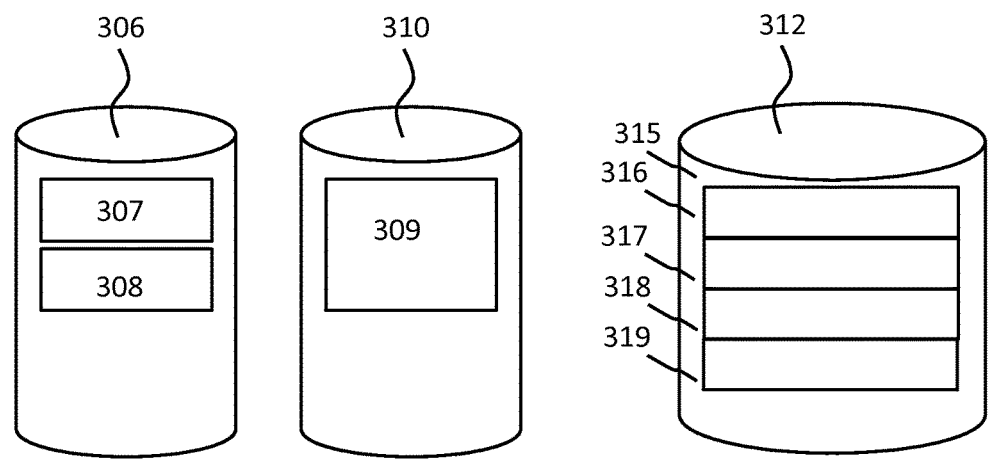
FIG. 3a is a simple block diagram of data stores in a 3D model to 2D image indexing system.
Figure 3B:
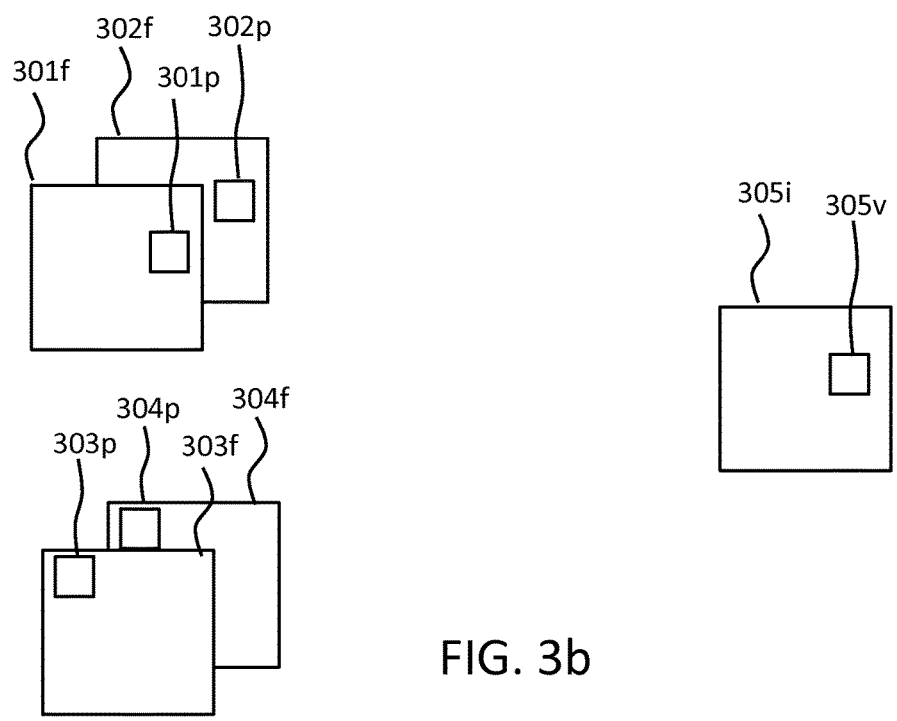
FIG. 3b is a simple block diagram of video frames and associated pixels used for generation of a 3D model voxel.

Shown in FIG. 3a is a data store in the form of server 306, wherein video data 307 and 308, indicative of a first video of a real world object and second video of the same real world object, are stored. For example, first video data 307 and second video data 308 were previously recorded by a first video camera and a second video camera, respectively. Video data 307 and video data 308 comprise video frame data and pixel data for each frame within the first and second videos. Video data 307 and video data 308 is processed to construct a 3D model of the real world object and 3D model data 309 is stored in a data store in the form of server 310. Shown in FIG. 3*b*, is an image 305*i* corresponding to the constructed 3D model. Pixels 301*p*, 302*p*, 303*p* and 304*p*, are selected from the first video 307*a* and second video 308*b* respectively to generate voxel 305*v* in 3D image 305*i*. Indicators of the correlation between pixels 301*p*, 302*p*, 303*p* and 304*p* and voxel 305*v* are stored in an index within a data store in the form of server 312. A specific and non-limiting example of the index is an index within database 315 comprising entries 316, 317, 318, 319 wherein each entry relates voxel 305*v* to one of each pixel 301*p*, 302*p*, 303*p* and 304*p*, respectively. For example, each entry comprises voxel 305*v* ID data and pixel ID data for each of pixels 301*p*, 302*p*, 303*p* and 304*p*. This allows searching of pixels based on a voxel and reverse searching of voxels based on a pixel. Alternatively, the index is a one directional index allowing for searching from a voxel to a pixel, uniquely. Further alternatively, the index is a one directional index allowing for searching from a pixel to a voxel, uniquely.

Pixel ID data comprises pixel identification and location information for locating each pixel and its associated image/frame. For example, entry 316 indicates pixel 301*p* is located in server 306, the first video, frame 301*f* as well as the location of pixel 301*p* within frame 301*f*. A process searches database 315 for retrieving videos, frames and/or pixels used for the construction of voxel 305*v* in the 3D model locates entries 316, 317, 318, and 319 and retrieves pixel ID data comprising location information for each of pixels 301*p*, 302*p*, 303*p* and 304*p*, respectively. Alternatively, the index is other than stored in a database. Various methods for creating, organizing, storing, and indexing as well as searching and retrieving data from a dataset is implementable.

In use, the expert reviews the 3D model for areas of concern. When an area of concern is identified, the expert chooses to retrieve and review image data relating to that area of concern. For example, each image is automatically retrieved based on the correlation between the images and the identified voxel. Alternatively, each image is retrieved and the corresponding pixels therein are highlighted or indicated. When indexing allows for bidirectional correspondence, then the expert can also go from an identified concern within a 2D image to the corresponding voxel within the 3D model. Thus navigation of the 3D model and source data—the images/frames—is supported without significant burden on the expert.

Figure 4:
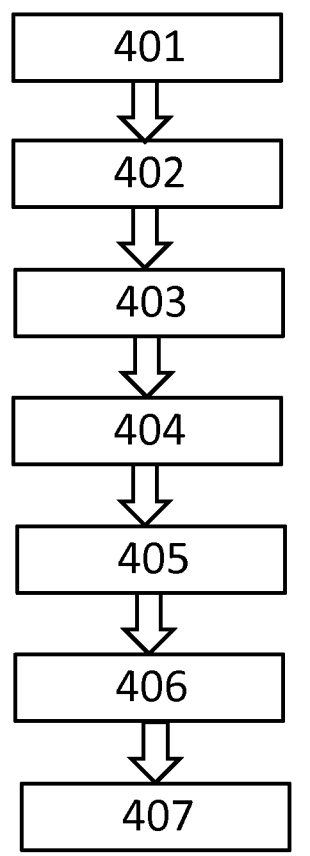
FIG. 4 is a simple flow diagram of an indexing method wherein an operator annotates video captured of a real world object.

FIG. 4 is a simple flow diagram of an indexing method wherein an operator annotates video captured of a real world object according to an embodiment of the invention. An operator captures video of an industrial installation at 401 for inspection of an industrial installation. At 402, the operator indicates that many plants have grown near an outlet port of the industrial installation used for exhausting waste. For example, the operator records a verbal note simultaneously as the plants and outlet port are being recorded by video cameras. Alternatively, the operator adds a visual cue to the video to indicate the issue and/or identify the portion of the industrial installation causing concern. Other methods of annotating and identifying areas of concern by the operator are implementable. At 403, the indication provided by the operator is associated with the video frames and/or pixels identified and an indication of the association is stored in a data store for future retrieval. During generation of the 3D model based on the video recorded as described above, annotations provided by the operator are also associated with corresponding voxels and/or portions of the generated 3D model. At 404, indications of the association of the video frames and/or pixels used in the generation of portions of the 3D model are stored in a data store for future retrieval. A specific and non-limiting example is a portion of the 3D image of the generated 3D model is highlighted onscreen as a result of an annotation provided by the operator. When the highlighted portion is selected any audio or visual cues associated with that portion of the 3D model is accessible. The generated 3D model may show the plants or the plants may be filtered from the model by an additional filtering process. In either case, it is not straightforward to show a 3D image of, or accurately model the behaviour of, the plants. As such, even with a perfect 3D model of the industrial installation, an expert viewing the 3D image of the generated 3D model for inspection of the industrial installation is likely to want further information than the 3D model provides. For example, the expert wants to view and analyse the source images or video footage pertaining to the annotated portion of the industrial installation. By selecting the highlighted portion of the industrial installation within the 3D model at 405 information related to the highlighted portion is provided to the expert at 406. Specific and non-limiting examples of information provided include, date and time the video was annotated, other video footage/frames/pixels of the same portion of the industrial installation during the original video recorded by the operator, and video footage/frames/pixels of the same portion of the industrial installation recorded previously. It is now possible to not only view the annotated portion of the video footage, but also to review and evaluate all previous video footage of the annotated portion of the 3D model at 407. Perhaps viewing previously recorded images of the annotated portion of the industrial installation of concern is more revealing or more telling in the expert's analysis. Of course, a portion of a 3D model need not be annotated or highlighted for an expert to be provided further information as described above. Optionally, the expert selects any portion of the 3D image to retrieve such information. For example, the expert may select a portion of the 3D image by clicking on a point—a voxel—of the 3D image or by highlighting a portion—a group of voxels.

Similarly, at another point in the inspection, the operator notes a dent in a pipe. Once again, video footage of the pipe is reviewed and is indexed to a location within the 3D model. Based on the index data, other video footage of the dent is also retrievable for analysis. The retrieved video footage of the dent provides a view of the dent at a different angle and under different lighting conditions which enables the expert to see a hairline crack at each end of the dent. Whereas the operator noted the dent, the operator could not see the crack at that time. In fact, the expert also required a different view to see the cracks. Because all video image frames that correlate to the voxels associated with the dent were retrieved, the hairline crack was identified.

Figure 5:
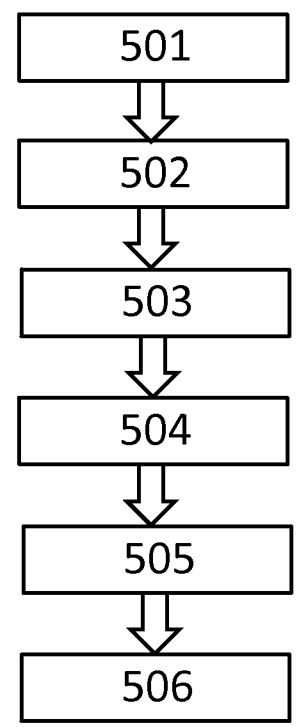
FIG. 5 is a simple flow diagram of another indexing method according to an embodiment of the invention.

FIG. 5 is a simple flow diagram of another indexing method according to an embodiment of the invention. A 3D model of a real world object is constructed at 501. Each new inspection—video recording of the real world object—generates a new 3D model that is correlated to the previously generated 3D model at 502. Thus, each voxel in a newly generated 3D model is correlated to images/frames/pixels from the most recent inspection and is also correlated to images/frames/pixels from previous inspections. Then, at 503, a voxel is identified for future monitoring and the identified voxel is highlighted in 3D images of newly generated 3D models at 504. The images/frames/pixels of the surface of the real world object that are correlated to the highlighted voxel are now identifiable—in both past and present inspections. This allows the expert to review the present images and compare them to past images at 505 in a convenient and efficient manner without manually searching through previously recorded videos to find the corresponding images of the surface of the real world object that is of interest.

Furthermore, during an inspection of the real world object, for example, an industrial installation, an operator indicates that a lot of plants have grown near an outlet port for exhausting waste, and the voxel, or group of voxels, of the generated 3D model correlated to the 2D images of the area of interest, is highlighted in the 3D image of the 3D model, to draw the attention of the expert to that portion of the 3D image when the 3D model is under review. A reminder for the expert to analyse and evaluate the plant growth upon each new inspection is automatically generated to prevent oversights of the problem previously identified. Each time the operator inspects the installation; the expert is provided with image frames of the outlet port and of the plants growing nearby. The expert can analyse and evaluate the plant growth upon every inspection without needing the annotation and without having a detailed set of notes.

Further in the above example, if the plants are occasionally removed, the expert can review previous images to determine when, in the past, the clean up was performed. The expert has access, through the index data and through the 3D model, to past and present data relating to any surface of the real world object that is captured multiple inspections.

Yet further, by comparing 3D models over time, it is possible to provide a 3D time lapse of the industrial installation—a 3D video—and to provide an indication of changes of the real world object over time as captured during each. Thus, for example, each change detected in the real world object is indicated to the expert as the expert is walked through each change in the 3D model that was detected between each inspection.

When the 3D models are compared or updated over time, current data is optionally used to fill in indeterminate voxels from images captured during previous inspections. Inspections proximate in time are referred to as passes of the object. Such as when an image acquisition system circles a real world object capturing video data multiple times— multiple passes are conducted. For example, too many plants blocked a portion of the installation on the first three passes. After the third pass, a clean-up occurred. Then, on the fourth pass, the installation component(s) behind the plants is imaged for the first time and filled in within the 3D model. This also applies to inside elements when corrosion forms a hole in an installation or when other damage occurs.

Figure 6:
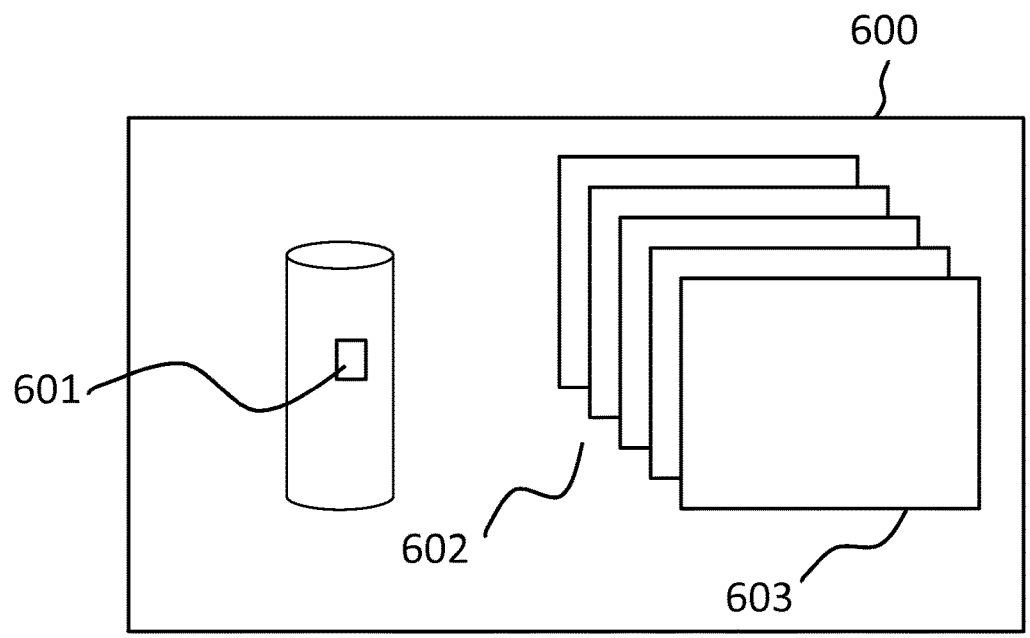
FIG. 6 is a simple screen diagram of a method of displaying image data in relation to the 3D model.
Figure 7:
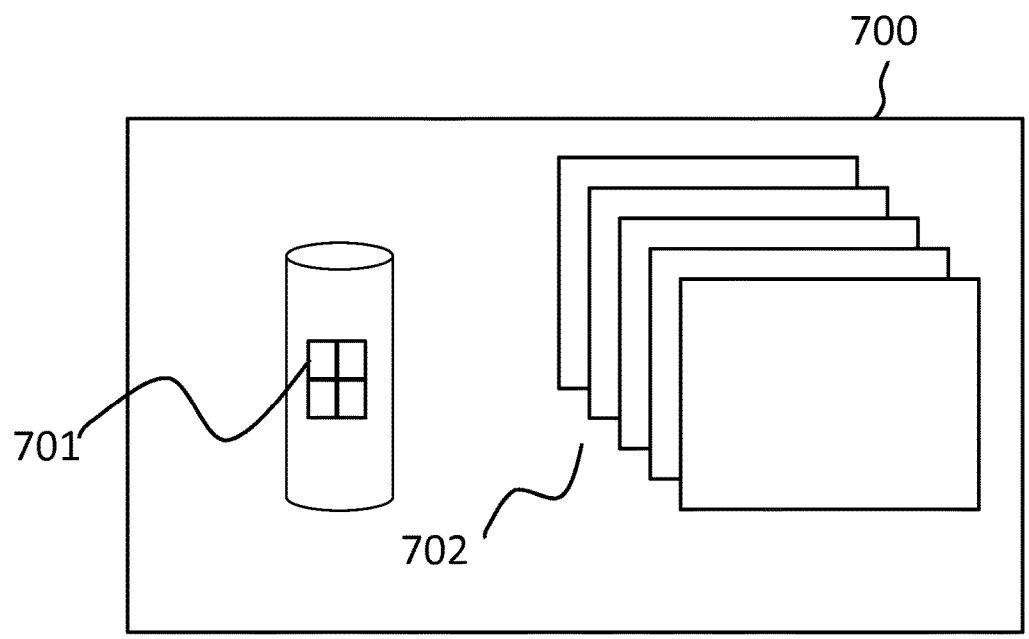
FIG. 7 is another simple screen diagram of a method of displaying image data in relation to the 3D model.

Referring to FIG. 6, shown is a simple screen diagram of a method of displaying image data in relation to the 3D model. A voxel 601 is selected within the 3D model at the left side of the screen. On the right side of the screen is shown a stack of video frames 602 including video frame 603 shown on top. Video frames 602 can be scrolled through with a dial or a scroll bar or another scrolling indicator allowing for ease of navigation through the associated images. Further, as shown in FIG. 7, it is possible to select a plurality of voxels 701 and to receive a stack of images 702 that is a logical union of the stacks of images resulting from the selection of each voxel. Thus, an area is examinable by selecting a single voxel or, alternatively, by selecting a group of voxels.

The examples above describe using image data to generate 3D models of a real world object. However, the data type for generation of 3D models is not limited to image data. The embodiments described above alternatively use non-image data associated with the real world object for the generation of a 3D model, and thus, the non-image data is indexed with voxels in the generated 3D model. A specific and non-limiting example includes temperature data collected by a heat sensor detecting the temperature of the surface of a real world object. Temperature data is collected periodically and used to construct 3D thermal models. Thus temperature data is indexed to generated 3D model voxels as well as to recent and past temperature data. Other data types include, but are not limited to acoustic data, seismic data and medical imaging data. Further alternatively, the data type is both image data and other than image data. Furthermore, other data is associatable with 2D image data, such as pixel data, and/or 3D model data, such as voxel data. Other data may or may not be used to construct a 3D model. Furthermore, other data is associatable with 2D image data during the capture thereof and/or post capture thereof. Similarly, other data is associatable with 3D model data during the construction thereof and/or post construction thereof. A specific and non-limiting example includes associating human generated data with a pixel and/or voxel and storing an indication of the association, for example in an index, as well as storing the human generated data associated therewith. Another specific and non-limiting example includes associating machine generated data with a pixel and/or voxel, and storing an indication of the association, for example in an index, as well as storing the machine generated data associated therewith. Other data associated with 2D image data and/or 3D model data is retrievable when 2D image data and/or 3D model data is selected. Other data may be associated within the dataset or with data within the dataset. For example, other sensors such as temperature sensors record data that is then associated with voxels.

Further, though the above description relates to indexing visual data to correlate one with another, it also supports indexing human provided data to images and to voxels. This supports analysis and evaluation of one form of data and indexing of the result such that it is retrievable in response to the data to which it relates whether voxel or pixel or image or video or another indexable element. Further, by selecting regions within images or the 3D model and labeling them, it is then possible to search on labels within all indexed media including user entered annotations, test results, and so forth.

For example, if a user highlights a portion of the 3D model and indicates that it is an outlet, then testing relating to the outlet can be associated with the outlet as will all views of the outlet within image data and within video data. By using the name of the part or a known indicator, it is possible to associate non-indexed material with the index— emails about the outlet—with the voxels, pixels, images, videos, and other data.

The embodiments presented are exemplary only and persons skilled in the art would appreciate that variations to the embodiments described above may be made without departing from the scope of the invention.

What is claimed is:

1. A method comprising:
   capturing 3D model data relating to each of a plurality of voxels, the 3D model data relating to an object and for forming a 3D model of the object;
   capturing a plurality of images of the object wherein each of the plurality of images comprises at least one pixel, said plurality of images being stored as image data;
   correlating the image data of the object with the 3D model data to produce an index, the index indicating a correlation between at least one pixel of an image and at least one voxel of the 3D data, each of said at least one pixel and said at least one voxel representing a same portion of said object; and
   storing the index for retrieval.

2. The method according to claim 1 comprising:
   selecting a first voxel of the plurality of voxels;
   based on the first voxel, retrieving from the index an indication of each image correlated with the first voxel; and retrieving and displaying on a display at least one image correlated with the first voxel.

3. The method according to claim 2 comprising: highlighting within the at least one image at least one pixel associated with at least one voxel of the plurality of voxels.

4. The method according to claim 1 comprising:
   selecting a first plurality of voxels of the some of the plurality of voxels;
   based on the first plurality of voxels, retrieving from the index an indication of each image correlated with the first plurality of voxels; and retrieving and displaying at least one image correlated with at least a first voxel of the first plurality of voxels.

5. The method according to claim 1 comprising:
   selecting a first plurality of voxels of the some of the plurality of voxels;
   based on the first plurality of voxels, retrieving from the index an indication of each image correlated with one of the first plurality of voxels; and
   retrieving and displaying at least one image correlated with at least a first voxel of the first plurality of voxels.

6. The method according to claim 1 wherein correlating comprises correlating the at least one pixel of each of the some of the plurality of images and at least one voxel of each of the some of the plurality of voxels; and storing data indicative of the correlation.

7. The method according to claim 6 comprising:
   selecting a first pixel from the some of the plurality of images;
   based on the first pixel, retrieving from the index an indication of a first voxel of the some of the plurality of voxels correlated to the first pixel; and retrieving and displaying at least one image formed by projecting the 3D model including the first voxel onto a 2D plane.

8. The method according to claim 6 comprising:
   selecting a first plurality of pixels from the some of the plurality of images;
   based on the first plurality of pixels, retrieving from the index an indication of first voxels of the some of the plurality of voxels correlated with each of the first plurality of pixels; and
   retrieving and displaying at least one image formed by projecting the 3D model including the first voxels onto a 2D plane.

9. The method according to claim 1 comprising:
   capturing stereoscopic image data indicative of stereoscopic images of an object and with a known correlation between the stereoscopic images, the stereoscopic images comprising pixels correlatable with surfaces within said stereoscopic images; and
   processing the stereoscopic image data to produce the 3D model data of the object, wherein correlating is performed by storing for each voxel of the plurality of voxels an indication of each pixel associated therewith.

10. The method according to claim 1 comprising:
    capturing a range image of the object; and capturing image data having a known correlation to said range image, the image data comprising pixels correlatable with surfaces within said range image, wherein correlating comprises processing the image data to store for each voxel of the plurality of voxels an indication of each pixel associated therewith.

11. The method according to claim 1 comprising:
    flagging a first voxel of the some of the plurality of voxels for monitoring over time;
    capturing second 3D model data relating to the object for forming a second 3D model;
    capturing a second plurality of images of the object;
    correlating the second plurality of images with the second 3D model to produce a second index, the second index for indicating a correlation between each of the second plurality of images and voxels within the second 3D model; storing the second index for retrieval; and
    correlating the second 3D model with the first 3D model to correlate the index and the second index.

12. The method according to claim 1 comprising:
    flagging a first voxel of the plurality of voxels for monitoring over time;
    capturing a second plurality of images of the object;
    correlating the second plurality of images with the 3D model to produce a second index, the second index for indicating a correlation between some of the second plurality of images and voxels within the 3D model; and storing the second index for retrieval, wherein the second index and the index are useful for correlating between the some of the plurality of images and the some of the second plurality of images.

13. The method according to claim 1 comprising: associating first data other than image data and 3D model data with some of the plurality of images correlated with some of the plurality of voxels; and storing data indicative of the association.

14. The method according to claim 13 wherein the first data is human generated data.

15. The method according to claim 1 wherein an index for indexing each of the images comprises a look up table.

16. The method according to claim 1 wherein an index for indexing each of the images each index comprises a many to many index for associating many images with a single voxel and many voxels with a single image.

17. A method comprising:
    viewing an image of an object;
    selecting at least a pixel within the image of the object, the at least a pixel within the image of the object being stored as image data;
    correlating the image data of the object with a voxel within a 3D model of the object; and
    retrieving a plurality of images of the object, each of the plurality of images indexed in association with the voxel to indicate a correlation between at least a pixel of an image and at least one voxel of said 3D model, each image of the plurality of the images including a view of a same surface of the object as the selected at least a pixel.

18. The method according to claim 17 comprising: associating first data other than image data and 3D model data with the at least a pixel within the image of the object; and storing data indicative of the association.

19. The method according to claim 18 wherein the first data is human generated data.

20. The method according to claim 17 wherein the plurality of images includes images captured during different inspections of the object.

21. The method according to claim 17 wherein the plurality of images is divided into sets, each set from a single unique inspection of the object.

22. The method according to claim 17 wherein the images are each indexed by an index, each index in association with the voxel comprises a loose association based on an association with a voxel close to the selected voxel but other than the selected voxel.

23. A method comprising:
    capturing 3D model data relating to each of a plurality of voxels, the 3D model data relating to an object;
    capturing sensor data associated with the object;
    correlating the sensor data with the 3D model data to produce an index, the index for indicating a correlation between some of the sensor data associated with the object and some of the plurality of voxels, said sensor data and said 3D model data representing a same portion of said object; and
    storing the index for retrieval.

24. The method according to claim 23 wherein sensor data comprises image data and other than image data.

* * * * *